No. 841,960. PATENTED JAN. 22, 1907.
A. W. GRAY.
PACKING FOR ROTARY STEMS.
APPLICATION FILED JULY 23, 1906.

Witnesses.
W. F. Booth Jr.
N. A. Acker

Inventor.
Arthur W. Gray
by Wm. F. Booth
his Attorney.

UNITED STATES PATENT OFFICE.

ARTHUR W. GRAY, OF BERKELEY, CALIFORNIA.

PACKING FOR ROTARY STEMS.

No. 841,960.  Specification of Letters Patent.  Patented Jan. 22, 1907.

Application filed July 23, 1906. Serial No. 327,393.

*To all whom it may concern:*

Be it known that I, ARTHUR W. GRAY, a citizen of the United States, residing at Berkeley, in the county of Alameda and State of California, have invented certain new and useful Improvements in Packing for Rotating Stems, of which the following is a specification.

My invention relates to packing for rotating stems for operating-valves or other mechanism within a closed chamber.

The general object of my invention is to secure a joint tight against fluid-pressure between the walls of a closed chamber and the rotating stem which operates the part or mechanism within said chamber.

Particular objects and advantages of my invention will hereinafter appear.

My invention consists in a washer seated between a collar on the rotating stem and the opposing end of the wall bounding the entrance to the closed chamber and through which wall the stem passes, in conjunction with a pressure device for forcing said collar and wall end together to clamp the washer between them.

It also consists in the novel construction, arrangement, and combination of parts which I shall now fully describe by reference to the accompanying drawings, in which I have illustrated a practical arrangement of my invention.

Figure 1:
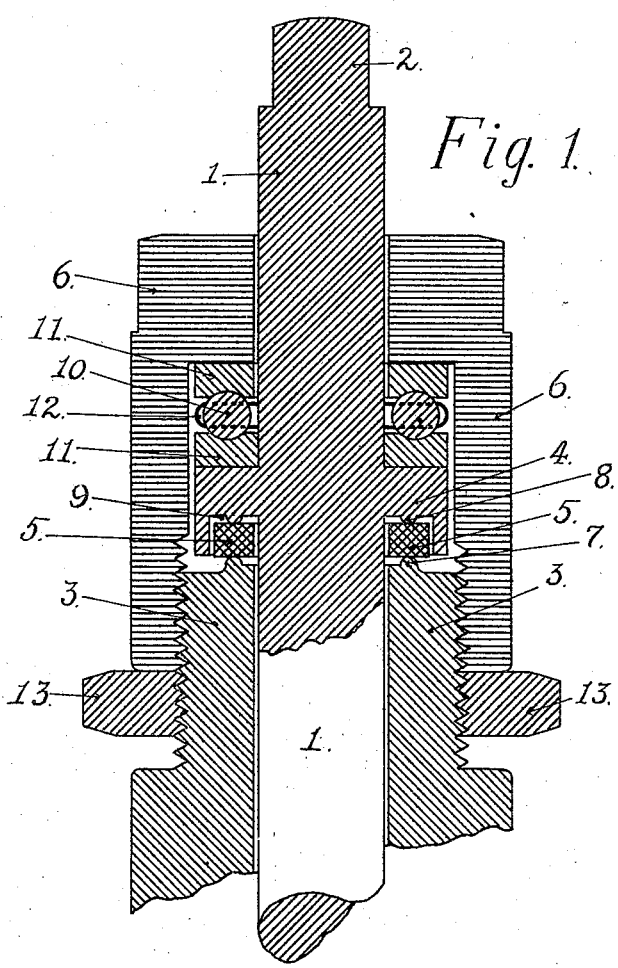
Figure 2:
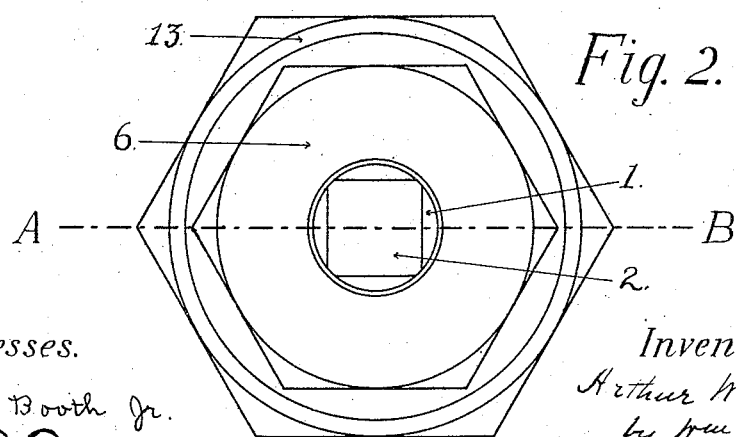

In the drawings, Figure 1 is a vertical section in the plane A B of Fig. 2 of the packing, showing its application to a rotatable stem. Fig. 2 is a top plan or horizontal projection of the same.

1 is a stem of any character adapted to be rotated by suitable means—as, for example, by means of a wrench applied to the squared upper end 2 of the stem. This stem may be supposed to operate a valve or any other mechanism within a closed chamber, its lower end to be fashioned for proper engagement with the part to be operated and which herein need not be shown, as my invention relates wholly to the packing of the joint at which the rotation of the stem takes place.

3 is the wall which bounds the entrance to the closed chamber and through which the stem passes, as shown. The stem is provided or formed with a collar 4 beyond the end of wall 3, and between this collar and the wall end is formed a seat in which is interposed a washer 5, which is best a flat substantially solid one of any suitable material.

A suitable pressure device, which in its best form is a nut 6, engaging the wall 3 and exerting its pressure on the collar 4, is employed to force the collar and wall end together to clamp the washer between them, and thus make the joint at which the stem turns tight against fluid-pressure. To increase the efficiency of the packing, the washer 5 is best seated on a ridge or ridges in either the wall end or the collar or in both. I have for the sake of illustration here shown one such ridge 7 in the wall end and a ridge 8 in the collar. The seat for the washer may be a partially-inclosed one formed by a concavity or groove in either the wall end or the collar, here shown as in the collar, (indicated by 9,) and the washer may either be forced into this groove and cemented therein to make one fixed joint and one sliding joint or it may loosely fit therein, as shown, to form two sliding joints. The pressure of the nut 6 may be either directly upon the collar, or, as here shown, its pressure is best applied through the intervention of any suitable form of ball-bearing, that here shown comprising balls 10 in cups 11, the balls being fitted to a retaining-cage 12. This bearing by reducing the friction of turning adds to the efficiency of the device. 13 is a check-nut which may be used, if desired.

This packing for rotating stems possesses the following advantages: The pressure employed to tighten the joint is applied at right angles to the slipping surfaces, so that the pressure with which these surfaces bear against each other can be easily adjusted. Making the surfaces bearing against each other in the form of rounded annular ridges secures a very tight joint without introducing undue friction to resist the rotation of the stem. Such a joint can easily be made absolutely tight, even when confining a gas under a pressure of several hundred atmospheres. There are only two joints across which a leak can take place, and these can be reduced to one, if desirable. This form of packing is very easily and quickly renewed when worn out. With the use of ball-bearings no lubrication is necessary, enabling such a joint to be used where lubrication would be impossible or undesirable. If desired, oil or other lubricant can easily be introduced to all rubbing surfaces between the stem and the pressure-nut 6 or through a special oil-hole without disturbing the joint. The simplicity and ease of construction enable such a joint to be made very cheaply.

Having thus described the invention, what I claim as new, and desire to secure by Letters Patent, is—

1. A packing for a rotating stem comprising a wall through which the stem passes, a collar on the stem beyond the wall end, a substantially solid washer seated between the collar and the wall end, and a pressure device for forcing the wall and collar together to clamp the washer between them.

2. A packing for a rotating stem comprising a wall through which the stem passes, a collar on the stem beyond the wall end, a substantially solid washer seated between the collar and the wall end, and a pressure-nut engaging both wall and collar to force them together to clamp the washer between them.

3. A packing for a rotating stem comprising a wall through which the stem passes, a collar on the stem beyond the wall end leaving a space between itself and said end, a ridge projecting into said space concentric with the stem, a substantially solid washer seated in said space upon said ridge, and a pressure device for forcing the wall and collar together to clamp the washer between them.

4. A packing for a rotating stem comprising a wall through which the stem passes, a collar on the stem beyond the wall end leaving a space between itself and said end, a ridge projecting into said space concentric with the stem, a substantially solid washer seated in said space upon said ridge, and a pressure-nut engaging both wall and collar to force them together to clamp the washer between them.

5. A packing for a rotating stem comprising a wall through which the stem passes, a collar on the stem beyond the wall end, a substantially solid washer seated between the collar and wall end, a pressure-nut engaging the wall and the stem-collar to force them together to clamp the washer between them, and a ball-bearing disposed between the pressure-surfaces of the nut and collar.

6. A packing for a rotating stem comprising a wall through which the stem passes, a collar on the stem beyond the wall end leaving a space between itself and said end, a ridge projecting into said space concentric with the stem, a substantially solid washer seated in said space upon said ridge, a pressure-nut engaging the wall and the stem-collar to force them together to clamp the washer between them, and a ball-bearing disposed between the pressure-surfaces of the nut and collar.

In testimony whereof I have signed my name to this specification in the presence of two subscribing witnesses.

ARTHUR W. GRAY.

Witnesses:
N. A. ACKER,
L. E. WILKINS.